Patented Apr. 23, 1940

2,198,104

UNITED STATES PATENT OFFICE 2,198,104

BUTYL ALCOHOL FERMENTATION PROCESS

Edwin H. Carnarius, Peoria, Ill., assignor to Commercial Solvents Corporation, Terre Haute, Ind., a corporation of Maryland No Drawing. Application December 15, 1938, Serial No. 245,922

8 Claims. (Cl. 195—44)

My invention relates to the production of butyl alcohol and acetone by the fermentation of carbohydrate mashes by means of butyl alcohol-producing bacteria. More specifically, my invention relates to a process for modifying the ratio of butyl alcohol and acetone produced in the fermentation by certain butyl alcohol-producing bacteria.

A number of different types of butyl alcohol-producing bacteria, both of the essentially starch-fermenting class and of the essentially sugar-fermenting class, are available for the production of butyl alcohol, acetone and ethyl alcohol by the fermentation of carbohydrate mashes. Each of these various types of bacteria has been found to produce butyl alcohol, acetone and ethyl alcohol in a fixed ratio, from which very little deviation has been possible in commercial practice. Certain expedients have been suggested for varying the ratio of products produced by any given type of bacteria, but these in general have been undesirable from the standpoint of lowering total yield, or for other practical reasons applying to commercial operation.

In view of fluctuating prices and market demands, it would obviously be highly desirable to be able change the ratio of the products produced in a fermentation of this type, even to a slight extent, if the change produced is not accompanied by reduced yields or other factors offsetting the economic advantage of the changed product ratio. It may be seen that in large-scale commercial operation, involving the production of millions of pounds of mixed solvents per year, a change of only 1 per cent. in the ratio of solvents produced, might be highly desirable from this standpoint.

I have now found that in fermentations by means of butyl alcohol-producing bacteria designated *Clostridium saccharo-butyl-acetonicum-liquefaciens*, described in U. S. Patent 2,139,108 by C. F. Arzberger, and especially with the strain *Clostridium saccharo-butyl-acetonicum-liquefaciens-delta*, described in U. S. Patent 2,139,111 by E. H. Carnarius et al., the ratio of solvents produced may be changed to a marked extent by special temperature control during the fermentation. It had previously been observed that when employing these bacteria the optimum temperature range for fermentation constituted a temperature from somewhat above 84° F. to approximately 88° F. When the fermentation is effected within this temperature range, maximum yields are secured with minimum time of fermentation. I have now discovered, however, that if at least a portion of the fermentation, following the maximum growth phase of the bacteria, is effected at a temperature below 84° F., complete fermentation with full yield may be secured without unduly prolonged fermentation time, and with the material advantage of securing a substantially higher ratio of butyl alcohol to acetone in the products than is normally secured at fermentation temperatures above 84° F.

In carrying out my present invention, the preparation of the mash and control of the fermentation may be effected in accordance with previously-known practices for utilizing these particular bacteria, the only change being in the temperature control during the fermentation. Any of the various types of mashes disclosed in U. S. Patents 2,139,108 and 2,139,111, referred to above, may be employed, and the various expedients for controlling the conditions of the fermentation disclosed in these applications may likewise be used. For example, control of the hydrogen ion concentration of the fermenting mash by means of ammonia is suitably employed in conjunction with the temperature control of the present invention. I prefer, of course, to utilize the optimum conditions as to mash concentration, nutrients, and hydrogen ion control of the fermenting mash, as disclosed in these applications.

In effecting the temperature control in accordance with the present invention, the entire fermentation may be carried out at a temperature below 84° F., if so desired, but I prefer to effect the preliminary or growth phase of the fermentation at a temperature above 84° F. I have found that, in general, the former procedure tends to prolong the total fermentation time substantially more than the latter. In my preferred procedure, the fermentation is started at the optimum temperature for rapid growth of the particular strain of bacteria employed, and this temperature is maintained throughout the maximum growth phase of the fermentation. Following this phase of the fermentation, the mash is cooled to a temperature below 84° F., and maintained below this temperature for a substantial portion of the total fermentation time, preferably for a period of from one-fourth to one-half of the total fermentation time. After the initial cooling, the mash may be maintained at the lower temperature throughout the remainder of the fermentation, or the temperature may be allowed to rise during the remainder of the fermentation to a final temperature as high or even higher than the initial temperature for the growth phase of the fermentation. I prefer to employ the latter modification since satisfactory results may be secured by this procedure, and less cooling of the mash is involved.

The initial growth phase of the fermentation may be effected at temperatures of 84–88° F. for any of the strains of bacteria here involved, but it may be found that a specific temperature within this range will constitute the optimum for most rapid growth of the particular strain of bacteria employed. The duration of the initial growth phase, or the period of maximum reproduction of the bacterial cells, will vary to some extent, depending upon the activity of the particular strain of bacteria utilized and the temperature employed. However, with any of the bacteria here involved, the mash may be cooled after a period of from 14 to 20 hours, and approximately 16 hours will usually be found to be most satisfactory. The exact optimum under any given operating conditions may, of course, readily be determined by preliminary experiments.

The temperature to which the mash may be cooled in accordance with the present invention will depend upon the rapidity of fermentation desired, the size of the body of fermenting mash, and the external or atmospheric temperature. I have found that, in general, the lower the temperature to which the mash is cooled, the longer will be the resulting over-all time of fermentation. From this standpoint, extreme cooling will be undesirable, particularly if the lowered temperature is to be maintained throughout the remainder of the fermentation. However, if the temperature is to be allowed to rise after cooling, and the external temperature is relatively high, the mash may be temporarily cooled to a much lower temperature than would be desirable if maintained during the remainder of the fermentation. Since some heat is generated by the fermentation itself, the size of the body of mash, with relation to the surface of the fermentation vessel, will of course also affect the temperature gradient when the mash temperature differs from the external temperature.

In general, I have found that temperatures below 74° F. for the entire fermentation, or for the entire fermentation period following the growth phase, are undesirable from the standpoint of extended fermentation time, and that temperatures below 70° F. are undesirable even if the temperature of the mash is allowed to rise following the cooling at the conclusion of the growth phase of the fermentation. It should be definitely understood, however, that these lower temperature limits are not fixed, and that my invention is operative when employing considerably lower temperatures. In such instances the prolonged fermentation periods would of course decrease somewhat the capacity of a fermentation plant of any given size, but the fermentations could nevertheless be thus carried out, and the higher ratio of butyl alcohol to acetone secured by the use of my invention would be realized.

In carrying out the fermentation in accordance with the present invention, the mash may be cooled to the desired fermentation temperature immediately after sterilization, and this temperature may then be maintained during the entire fermentation by any suitable means, such as passing cooling water over the exterior surface of the fermentation vessel, or utilizing internal cooling coils in the vessel. If the mash is to be cooled following the maximum growth phase of the fermentation, in accordance with the preferred modification of my invention, any of the ordinary expedients for cooling mash may be employed. However, when utilizing fermentation vessels of large capacity, and particularly if the external temperature is high, it will be found difficult to cool the fermenting mash merely by cooling the external surface of the vessel. Internal cooling coils may be employed, but I prefer to pump the fermenting mash from the vessel through a sterile cooling unit, and back into the vessel. Any suitable cooling device can be used for this purpose, and I have found that the common double-pipe cooler is quite satisfactory. It will be apparent that numerous modifications of the cooling procedure may be employed, such as effecting the initial stage of the fermentation in a mash of high carbohydrate concentration, and subsequently diluting the fermenting mash with sterile cold water. It is to be understood, therefore, that my invention is not limited to any particular mechanical means for effecting the cooling step.

My invention will now be illustrated by the following examples:

Example I

Duplicate mashes containing approximately 60 gm. sugar per liter, supplied in the form of high-test Cuban molasses, 0.27 gm. calcium acid phosphate per liter, and 0.06 gm. of lime per liter, were prepared and sterilized. These mashes were cooled to 88° F. and 80° F. respectively, inoculated with active cultures of *Clostridium saccharo-butyl-acetonicum-liquefaciens-delta*, and the fermentations effected at these temperatures. The temperatures were maintained at the desired points during the fermentation by passing cooling water over the external surfaces of the fermentation vessels. Hydrogen ion control of the fermenting mash was effected by periodic introduction of ammonia during the growth phase of the fermentation, totalling approximately 0.8 gm. $NH_3$ per liter of mash. The results secured are shown in Table I, below.

Example II

Duplicate mashes containing approximately 60 gm. sugar per liter, supplied in the form of high-test Cuban molasses, and 0.27 gm. calcium acid phosphate per liter, were prepared and sterilized. After cooling to 88° F. these mashes were inoculated with active cultures of *Clostridium saccharo - butyl - acetonicum - liquefaciens-delta*, and the fermentations effected under the temperature conditions indicated in Table II below. In one case the fermentation temperature was maintained at 88° F. throughout by passing cooling water over the external surface of the fermentation vessel. In the second case, this procedure was followed for the first sixteen hours of the fermentation, following which the fermenting mash was pumped through a double-pipe cooler, and the fermentation was then continued without further cooling. Hydrogen ion control of the fermenting mash was effected by periodic introduction of ammonia during the growth phase of the fermentation, totalling approximately 0.8 gm. $NH_3$ per liter of mash. The results secured are shown in Table II:

Table I

| Fermentation temperature | Over-all time of fermentation | Yield of total solvents based on initial sugar by weight | Distribution of total solvents, by volume | | |
| --- | --- | --- | --- | --- | --- |
| | | | Butyl alcohol | Acetone | Ethyl alcohol |
| °F. | Hours | Percent | Percent | Percent | Percent |
| 88 | 40 | 31.2 | 72.8 | 24.2 | 3.0 |
| 80 | 56 | 30.6 | 76.4 | 21.1 | 2.5 |

Table II

| Initial fermentation temperature | Fermentation temperature at 16 hrs. | Final fermentation temperature | Over-all time of fermentation | Yield of total solvents based on initial sugar, by weight | Distribution of total solvents, by volume | | |
|---|---|---|---|---|---|---|---|
| | | | | | Butyl alcohol | Acetone | Ethyl alcohol |
| °F. | °F. | °F. | Hours | Percent | Percent | Percent | Percent |
| 88 | 88 | 88 | 45 | 30.4 | 73.7 | 23.1 | 3.2 |
| 88 | 76 | 84 | 58 | 31.0 | 77.6 | 19.1 | 3.3 |

It is to be understood, of course, that the above examples are merely illustrative, and that my invention is not limited to the particular procedures employed. Any of the known fermentation conditions for these bacteria may be utilized as long as the temperature control is effected in accordance with the present invention. Likewise, the temperature control itself may be effected by other equivalent mechanical procedures. It is to be understood, therefore, that any modifications of procedure, or the use of any equivalents which would naturally occur to those skilled in the art, are included within the scope of my invention.

My invention now having been described, what I claim is:

1. In a process for the fermentation of a carbohydrate mash by means of *Clostridium saccharo-butyl-acetonicum-liquefaciens-delta* in which said mash undergoes the normal type of butyl alcohol fermentation to produce neutral end-products, the method of increasing the ratio of butyl alcohol to acetone in the end-products of the fermentation which comprises effecting at least a substantial part of the fermentation following the maximum growth phase, at a fermentation temperature below 84° F.

2. In a process for the fermentation of a carbohydrate mash by means of *Clostridium saccharo-butyl-acetonicum-liquefaciens-delta* in which said mash undergoes the normal type of butyl alcohol fermentation to produce neutral end-products, the method of increasing the ratio of butyl alcohol to acetone in the end-products of the fermentation which comprises effecting a portion of the fermentation comprising from one-fourth to one-half of the over-all fermentation time, following the maximum growth phase of the fermentation, at a fermentation temperature below 84° F.

3. In a process for the fermentation of a carbohydrate mash by means of *Clostridium saccharo-butyl-acetonicum-liquefaciens-delta* in which said mash undergoes the normal type of butyl alcohol fermentation to produce neutral end-products, the method of increasing the ratio of butyl alcohol to acetone in the end-products of the fermentation which comprises effecting a portion of the fermentation comprising from one-fourth to one-half of the over-all fermentation time, following the maximum growth phase of the fermentation, at a fermentation temperature of 74–84° F.

4. In a process for the fermentation of a carbohydrate mash by means of *Clostridium saccharo-butyl-acetonicum-liquefaciens-delta* in which said mash undergoes the normal type of butyl alcohol fermentation to produce neutral end-products, the method of increasing the ratio of butyl alcohol to acetone in the end-products of the fermentation which comprises effecting the maximum growth phase of the fermentation at a fermentation temperature above 84° F., cooling the fermenting mash at the conclusion of the maximum growth phase, to a temperature of 70–80° F., and allowing the temperature to rise during the remainder of the fermentation.

5. In a process for the fermentation of a carbohydrate mash by means of *Clostridium saccharo-butyl-acetonicum-liquefaciens-delta* in which said mash undergoes the normal type of butyl alcohol fermentation to produce neutral end-products, the method of increasing the ratio of butyl alcohol to acetone in the end-products of the fermenation which comprises effecting the fermentation at a fermentation temperature above 84° F. during an initial phase of 14–22 hours, thereafter cooling the fermenting mash to a temperature of 70–80° F., and allowing the temperature to rise during the remainder of the fermentation.

6. In a process for the fermentation of a carbohydrate mash by means of *Clostridium saccharo-butyl-acetonicum-liquefaciens-delta* in which said mash undergoes the normal type of butyl alcohol fermentation to produce neutral end-products, the method of increasing the ratio of butyl alcohol to acetone in the end-products of the fermentation which comprises effecting the fermentation at a fermentation temperature above 84° F., during an initial phase of approximately 16 hours, thereafter cooling the fermenting mash to a temperature of approximately 74° F., and allowing the temperature to rise during the remainder of the fermentation.

7. In a process for fermenting a carbohydrate mash by means of *Clostridium saccharo-butyl-acetonicum-liquefaciens-delta* while controlling the hydrogen ion concentration of the fermenting mash by means of ammonia to effect the normal type of butyl alcohol fermentation for the production of neutral end-products, the method of increasing the ratio of butyl alcohol to acetone in the end-products of the fermentation which comprises effecting at least a substantial part of the fermeneation, following the maximum growth phase, at a fermentation temperature below 84° F.

8. In a process for fermenting a molasses mash by means of *Clostridium saccharo-butyl-acetonicum-liquefaciens-delta* while controlling the hydrogen ion concentration of the fermenting mash by means of ammonia to effect the normal type of butyl alcohol fermentation for the production of neutral end-products, the method of increasing the ratio of butyl alcohol to acetone in the end-products of the fermentation which comprises effecting the fermentation at a fermentation temperature above 84° F. during an initial phase of 14–22 hours, thereafter cooling the fermenting mash to a temperature of 70–80° F., and allowing the temperature to rise during the remainder of the fermentation.

EDWIN H. CARNARIUS.